Feb. 7, 1939.  W. H. DOYLE  2,146,290
TOOTH AND MOUTH CLEANING IMPLEMENT
Filed June 20, 1936
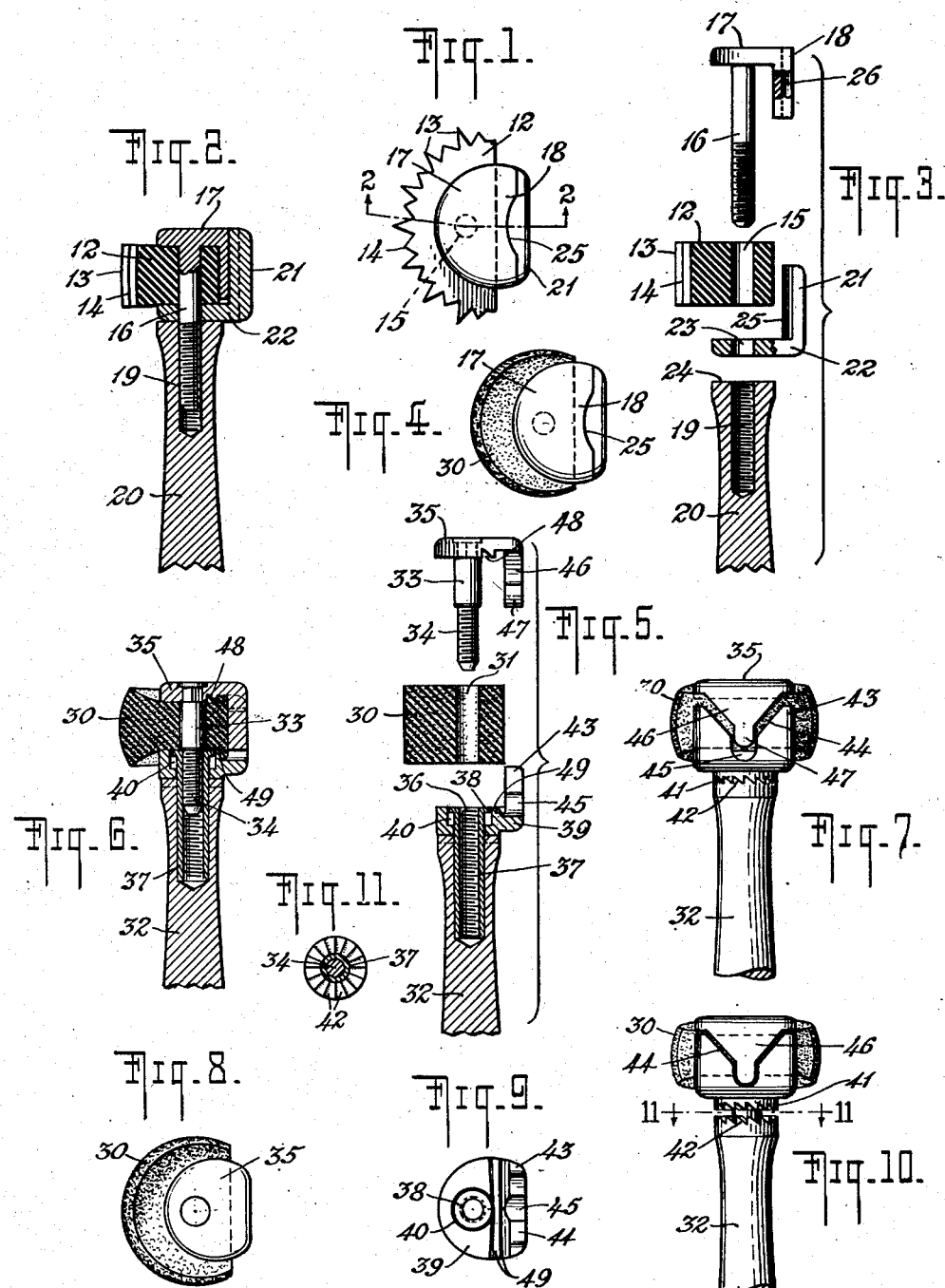
WITNESS
G. V. Rasmussen
INVENTOR
WILLIAM H. DOYLE
BY
ATTORNEYS Patented Feb. 7, 1939

2,146,290

UNITED STATES PATENT OFFICE 2,146,290

TOOTH AND MOUTH CLEANING IMPLEMENT

William H. Doyle, White Plains, N. Y.

Application June 20, 1936, Serial No. 86,256

15 Claims. (Cl. 15—210)

The invention relates to a device for cleaning the teeth and gums and massaging the latter, and finds its embodiment in a structure having a handle to which a cleaning segment may be applied in a readily detachable form. The device of my invention is such as to effectively combine a handle especially conforming to the contours of the mouth cavity, with a cleaning segment which may be readily and safely attached for use and as readily detached and replaced by a new segment.

The present invention is a continuation in part of my application Serial No. 29,703, filed July 3, 1935.

The invention has for its object to provide a tooth cleaning and gum massaging implement to take the place of the ordinary bristle toothbrush. The latter, while a fairly effective cleaner of teeth when new and sterile, becomes, after continued use, a breeding place for germs and therefore highly unhygienic.

The cleaning element of my novel structure is constituted of soft rubber designed for the purpose of being used but once so that a hygienic and sterile tooth and gum cleaning element is available at all times at a cost which is trivial in comparison with the cost of the ordinary bristle type of toothbrush.

According to the present invention, a tooth and gum cleaning implement is constituted of a handle and a readily detachable and replaceable cleaning segment or facing having a substantially continuous elastic body which may be used with equal effect either with or without a dentifrice.

In accordance with the invention, therefore, the cleaning segment comprises, more particularly, a facing of sponge rubber in the form of a segment of a cylinder and having a multiplicity of minute pores throughout the cleaning surface that act by pressure with a suction vacuum effect upon the surfaces of the teeth, in the interstices between the teeth, and in the small recesses of the grinding surfaces of the teeth. The pores of the sponge rubber afford a perfect receptacle for dentifrice of any kind—powder, paste, soap or fluid—and its vacuum action is unexcelled for applying dentifrices, alternately forcing the dentifrice onto the parts and sucking it in together with the loosened food particles, mucus and other materials that may be present according to the condition of the mouth, and which must be removed to maintain normal health in the mouth, or to aid in the cure of abnormal conditions. The pores of the sponge not only absorb material detrimental to mouth health, but hold this material, becoming in a short time "loaded." Comprehensive experimentation with my novel device has shown that the fine-pore sponge rubber per se, without the application of any dentifrice whatsoever, cleans the teeth and the mouth thoroughly.

The sponge rubber used in accordance with the preferred embodiment of my invention has certain advantages over a cleaning segment that is molded, because the latter issues from the molds with a "skin" formed on the surface by the molds. In accordance with my invention, the cleaning segments are made of fine-pore sponge rubber cut by special dies applied by power presses into the required shape out of sponge rubber mats of the desired thickness. The cut surface of the sponge rubber presents a facing having the degree of porosity which I have found most suitable for effective cleaning of mouth and teeth, not only because the open pores on the cleaning surface of the segment exposed by the cutting of the dies will hold and apply any dentifrice, but because such porous surface has a vacuum suction action which will pick up foreign particles in the mouth, particularly between the teeth and at the point of juncture of the gums with the teeth, such as pus, blood, and other matter that may be present in the mouth as a result of mouth and gum diseases.

The sponge rubber cleaning segments used in accordance with my invention have the additional advantage that they can be pressed into the spaces between the teeth which ordinarily could not be reached by bristles and to pick up efficiently food particles lodged therein. The use of sponge rubber is pleasant and prevents injury to tender gums or mouth tissues. It also eliminates the damage frequently caused by pricking of bristles of the ordinary toothbrush which have a tendency of becoming dislodged from the toothbrush head and sticking in the gums at vulnerable places, for instance, where the gums meet the teeth, frequently causing permanent damage to the gums.

In accordance with my invention, I secure a cleaning segment of the material described upon a handle which is of such design that it effectively and safely clamps the cleaning segment in position by simple manual operation capable of being carried out by the most inexpert of users, for instance, children of very immature age. Accordingly, the handle element of my novel tooth cleaning implement comprises a plurality of members so constructed and assembled that the rubber cleaning segment may be applied thereto with facility and to be retained thereon with surety and firmness so as to be effectively applied to its intended function, readily disassembled, the cleaning segment removed therefrom, and a new one secured in place thereof.

Specific embodiments of my invention are illustrated in the accompanying drawing in which Fig. 1 is an end view of one form of cleaning segment and holder; Fig. 2 is a section on the line 2—2 of Fig. 1; Fig. 3 is a view, partly in section, of the various elements ready to be assembled into the cleaning implement constituting one embodiment of my invention; Fig. 4 is an end view of another embodiment of cleaning segment to be used with the handle and holder of Figs. 2 and 3; Fig. 5 is a sectional view of the various elements ready to be assembled into a cleaning implement constituting another embodiment of my invention; Fig. 6 is a sectional view of the second form of my inventive structure in assembled condition; Fig. 7 is a face view of such embodiment; Fig. 8 is an end view of the second embodiment of my invention; Fig. 9 is an end view of the bottom portion of the clamping device; Fig. 10 is a face view of the cleaning implement showing the manner in which it may be disassembled; and Fig. 11 is a section on the line 11—11 of Fig. 10.

Referring more particularly to the drawing, in which similar reference characters identify similar parts in the several views, in the embodiment illustrated in Figs. 1–4, the cleaning segment is constituted of a rubber cleaning member 12 which may be extruded in the form of long half rods and thereafter cut into the required lengths, for instance, one-half inch. The cleaning surface of this element is provided with a plurality of long fins 13 and intermediate short fins 14. The element is provided with an aperture 15 through which passes, in securing the cleaning segment to the holder, the threaded stem or post 16 depending from a clamp head or upper jaw 17. Such upper jaw has a depending arm 18 adapted to cooperate, when the threaded stem 16 is passed into the threaded sleeve 19 in the handle 20, with the upwardly extending arm 21 in a second clamping head or lower jaw 22 having an aperture 23.

To prevent the cleaning segment from being used unless the clamp head 17 is screwed home, the cleaning segment 12, instead of fitting against the flat end 24 of the handle, is adapted to fit against the loose end wall of the clamp head 22 which has a convex projection 25 adapted to overlap and lie in the hollow 26 of the back 18 of the upper jaw 17.

The parts are so proportioned that the cleaning segment 12 turns easily upon the shank 16 unless such shank is screwed so far into the socket 19 that no parts can work loose in the mouth of the user.

It will be noted that upon assembling the cleaning segment within the locking jaws of the clamping structure, the material of the former, between the jaws 17 and 22, is slightly compressed as shown clearly in Fig. 2. This compression of the cleaning segment serves to seat the same securely within the jaws of the holder and not only prevents its rotation when the same is used in the operation of cleaning the teeth or massaging the gums, but also serves as a lock-washer to keep the jaws screwed up tight.

In Fig. 4 I have illustrated a cleaning segment made of the fine-pore sponge rubber hereinabove referred to, such segment being made in the form both best adapted to conform with the convolutions of the mouth and to fit and to be secured upon the clamping jaws of the handle illustrated in Figs. 2 and 3.

Referring now to the embodiment of my invention illustrated in Figs. 5–11 inclusive, the cleaning segment of such embodiment comprises a fine-pore sponge rubber member 30 in the form of a segment of a cylinder, with the cleaning surface thereof having the porosity secured by cutting pieces of the required shape out of sponge rubber mats so that only the two faces of the cleaning segment not adapted for the cleaning function have the "skin" referred to hereinabove.

Such sponge rubber cleaning segment is provided with an aperture 31 through which, in applying the cleaning segment to the clamping jaws of the handle 32, the shank 33 having the threaded portion 34 and depending from the clamping jaw 35, is adapted to pass and then be screwed into the internally threaded socket 36 in the handle 32.

The socket 36 comprises a metallic sleeve 37 extending into the handle 32, such sleeve having its upper periphery flanged as at 38. Surrounding the upper portion of the sleeve 37 is a clamping jaw 39 having a recess 40 so that the clamping jaw is slidably movable along the sleeve 37, being limited in such sliding movement by the abutment of the flange 38 against the surface of the clamping jaw forming the bottom of the recess 40. The bottom surface of the clamping jaw 39 is provided with serrations 41 forming a ratchet adapted to cooperate with serrations 42 provided upon the upper surface of the handle 32 so that the clamping jaw 39 is rotatable with respect to the handle 32 in only one direction.

Extending upwardly from one side of the clamping jaw 39 is a back 43 having a substantially triangular recess 44 cut therein, such triangular recess extending at its apex farther down into the back 43 so as to form an extension 45 of such recess.

The upper clamping jaw 35 is provided with a depending arm 46 having a substantially triangular configuration and a projection 47 at the apex thereof substantially of the same outline as the recesses 44 and 45 in the back 43 of the bottom clamping jaw. The back 46 and its projection 47 are adapted to enter, when the cleaning implement is assembled, into recesses 44 and 45, as clearly illustrated in Figs. 7 and 10. In such assembled form, the cleaning segment 30 is securely fastened upon the shank 33 and prevented from rotation about said shank by the cooperating backs 43 and 46. In the bottom surface of the clamping jaw 35 and in the upper surface of the clamping jaw 39 are provided cooperating notches 48 and 49, respectively, the projections formed by the notches being effective, in the assembled condition of the cleaning implement, to dig into the surfaces of the cleaning segment as clearly illustrated in Fig. 6 and to prevent further any tendency of such cleaning segment to rotate during the tooth or gum cleaning operation.

In assembling my novel cleaning implement, a fresh cleaning segment 30 is positioned upon the shank 33 by passing the same through the aperture 31 of such cleaning segment so that the flat face thereof abuts against the inner face of the back 46 of the upper clamping jaw. The shank 33 is then introduced into the socket 36, in a position in which the back 46 of the upper clamping jaw 35 is in line with the back 43 of the lower clamping jaw. The handle 32 is then turned clockwise until the shank 33 has entered the socket 36 as far as it will go and thereby firmly secure the cleaning segment between the upper and lower clamping jaws.

As clearly shown in Fig. 6, the cleaning segment is compressed to a considerable extent in the portions thereof held between the clamping jaws so that the cleaning segment assumes the form and shape shown in Fig. 6, with its cleaning surface curved to approximate the contour of a segment of a sphere. This curvature of the cleaning segment, produced by the grip of the clamping jaws, is of great importance in that (1) it conforms most nearly to the convolutions and arches of the gums and mouth and (2) it spreads the pores of the sponge rubber for most effective use with or without dentifrice, achieving the maximum vacuum suction effect when pressure is applied during the tooth and gum cleaning operation. The interlocking backs 43 and 46 permit the application of pressure over the entire curved cleaning surface of the segment, from end to end, not possible without such support because of the extreme softness of the sponge rubber, which otherwise would "wrap" around the shank or post 33.

To remove the cleaning segment from the holder, it is only necessary to press the two clamping jaws 35 and 39 toward each other, as shown in Fig. 10, so as to disengage the ratcheted lower surface of the latter from the ratcheted upper surface of the handle, when the handle may be turned counter-clockwise until the shank 33 is released entirely from within the sleeve 36. The cleaning segment 30 may then be removed from such shank and a new one substituted therefor.

It will be noted that the construction of my handle and clamping jaws is such that the moment the thread of the shank 33 is engaged in the sleeve 37, the upper clamping jaw 35 and the cleaning segment are securely locked. Also, that the cleaning segment may be positioned upon the shank 33 with facility, the depending back 46 of the upper clamping jaw 35 being so shaped that the cleaning segment can be positioned upon the shank 33 in only one and the correct way, that is, with the curved cleaning surface to the front of the handle. The backs 46 and 43 of the two clamping jaws engage each other automatically as soon as the shank 33 is screwed into the threaded sleeve 37, and any lateral movement of the back 43, because it interlocks with back 46, as shown in Fig. 7, will control a corresponding lateral movement of the clamping jaw 35, thus synchronizing the operation of the entire assembly when the device is in use.

The action of the clamping elements hereinabove described is automatic to the degree that if an operator, for instance, a child, did not quite screw up the handle until the clamping members have become cooperatively engaged, the assembled elements would automatically tighten up in the mouth as soon as pressure has been applied to the cleaning segment.

The handles and clamping jaws of my novel cleaning implement may be made of any suitable material, for instance, composition material of any of the well known types to be found on the market, and capable of being sterilized in boiling water.

While I have described particular embodiments of my invention, it is obvious that various changes may be made therein, particularly in the arrangement and configuration of the several parts, without departing from my invention.

I claim:

1. A tooth and mouth cleaning implement comprising a handle, a detachable and replaceable apertured cleaning element of resilient material mounted at one end thereof, and a clamping device for securing said element upon said handle against rotation, comprising a stem extending through said cleaning element and into said handle, and two members adapted to compress a portion of said cleaning element by movement of the two members toward each other upon said stem, whereby the cleaning surface of the remaining portion of said element assumes a curved shape which more nearly conforms to the convolutions and arches of the mouth, and in which one of the members of the clamping device is mounted for rotation upon the handle and the other is fixedly secured upon the threaded stem.

2. A tooth and mouth cleaning implement comprising a handle, a detachable and replaceable apertured cleaning element of resilient material mounted at one end thereof, and a clamping device for securing said element upon said handle against rotation, comprising a stem extending through said cleaning element and into said handle, and two members adapted to compress a portion of said cleaning element by movement of the two members toward each other upon said stem, whereby the cleaning surface of the remaining portion of said element assumes a curved shape which more nearly conforms to the convolutions and arches of the mouth, and in which one of the members of the clamping device is provided with a convex surface and the other with a correspondingly curved concave surface positioned for cooperative engagement by the convex surface to secure the members to each other against relative rotation.

3. A tooth and mouth brush comprising a handle, a resilient cleaning element the front face of which is substantially in the form of a segment of a cylinder and the rear face of which is substantially flat, said element being provided with an opening, and clamping means including a member which passes through said opening and two arms extending toward each other and adapted to cooperate to clamp the rubber element rigidly to the handle, said flat rear face of the segment of a cylinder cooperating with the clamping members to prevent rotation thereof.

4. A tooth and mouth brush comprising a handle, a cleaning element the front face of which is substantially in the form of a segment of a cylinder and characterized by substantial porosity, and the rear face of which is substantially flat, said element being provided with an opening, and clamping means including a member which passes through said opening to clamp the rubber element rigidly to the handle, said flat rear face of the segment of a cylinder cooperating with the clamping members to prevent rotation thereof.

5. A mouth and tooth cleaner comprising a handle, a detachable and replaceable apertured rubber cleaning segment secured thereto, a clamping member having an apertured arm intermediate the cleaning segment and the end surface of the handle and an arm extending perpendicularly from said first arm, a second clamping member having an arm, a threaded stem depending from said arm through said apertures and into said handle, and an arm adapted to cooperate with the perpendicularly extending arm of the first clamping jaw to secure the cleaning segment to the handle, said arms being effective to cooperate with the cleaning segment to prevent rotation thereof.

6. A mouth and tooth cleaner comprising a handle, a detachable and replaceable apertured rubber cleaning segment, substantially in the form of a segment of a cylinder, a clamping member having an apertured arm intermediate the cleaning segment and the end surface of the handle and an arm extending upwardly from, and at right angles to said first arm, a second clamping member having a threaded stem extending through said apertures and into said handle, and an arm adapted to engage the perpendicularly extending arm of the first clamping jaw to secure the cleaning segment to the handle, said arms being effective to cooperate with the cleaning segment to prevent rotation thereof.

7. A tooth and gum cleaning implement comprising a handle, a clamping jaw upon the end of the handle comprising an apertured rotatable element having an arm extending coaxially with the handle and provided with an arcuate surface, and a second element having a threaded stem adapted to extend through the aperture in the first element and into said handle and having an arm provided with an arcuate surface for cooperatively engaging the arcuate surface of the first element, and a detachable and replaceable apertured cleaning segment of rubber secured under compression but non-rotatably upon said stem and between said elements.

8. A tooth and gum cleaning implement comprising a handle, a clamping jaw upon the end of the handle comprising an apertured rotatable element having an arm extending coaxially with the handle and provided with an arcuate surface, and a second element having a threaded stem adapted to extend through the aperture in the first element and into said handle and having an arm provided with an arcuate surface for cooperatively engaging the arcuate surface of the first element, and a detachable and replaceable apertured cleaning segment of sponge rubber secured under compression non-rotatably upon said stem and between said elements.

9. A mouth and tooth cleaner comprising a handle, a detachable and replaceable apertured resilient cleaning segment secured thereto, a clamping member having an apertured arm intermediate the cleaning segment and the end surface of the handle, an arm extending at right angles to said first arm and having a substantially triangular recess therein, a second clamping member having a threaded stem extending through said apertures, and an arm of substantially triangular configuration adapted to enter the recess of the arm of said first mentioned member to secure the cleaning segment under compression to the handle, said clamping members being effective to cooperate with the cleaning segment to secure the same against rotation with respect to the handle.

10. A mouth and tooth cleaner as claimed in claim 5 in which one of the clamping members has its bottom surface provided with serrations and the upper end surface of the handle is provided with corresponding serrations to constitute a ratchet preventing rotation of the handle in one direction.

11. A mouth and tooth cleaner as claimed in claim 5 in which the clamping members have a portion of their respective surfaces facing each other provided with notches.

12. A tooth and mouth cleaning implement comprising a handle, a detachable and replaceable apertured cleaning element of resilient material mounted at one end thereof, and a clamping device for securing said element upon said handle against rotation, comprising a threaded stem extending through said cleaning element and into said handle, and two members adapted to be brought into abutting relation and to compress a portion of said cleaning element by movement of the two members toward each other upon said threaded stem, whereby the cleaning surface of the remaining portion of said element assumes a curved shape which more nearly conforms to the convolutions and arches of the mouth.

13. A tooth and mouth brush comprising a handle, a cleaning element characterized by substantial porosity, having faces including a rear face which is substantially flat, said element being provided with an opening, and clamping means including a member which passes through said opening to clamp the element rigidly to the handle, and a second clamping member at the rear, said flat rear face of the cleaning element cooperating with the clamping members to prevent rotation thereof.

14. In a tooth brush, the combination of a porous, flexible, apertured replaceable cleaning element having a face for cooperation with a backing means and adjacent faces in planes different from the plane of the first named face, a holder comprising a handle member, means passing through the aperture in the cleaning element cooperating with the handle member to hold all of the parts together, means to restrain the cleaning element from unintended separation from the handle, and backing means secured to said handle and effective in the assembled condition of the element and the handle parts to provide a surface extending in a plane parallel to the first-mentioned face of the element and sufficiently close thereto to check rotation of the cleaning element on the means which pass through its aperture.

15. As a new article of manufacture, a porous, flexible, replaceable cleaning element for a tooth brush handle, which includes an aperture-penetrating portion, said element having certain faces in angular relation to each other, said element having an aperture extending therethrough closely adjacent said first named face and parallel thereto, and being adapted for the reception therethrough of a member for securing the element to a handle, said first mentioned face of the element being adapted to be secured in apposition to a corresponding face of the handle, whereby rotation of the element is checked, while other portions of the surface of the element become available for utilization as tooth cleaning friction surfaces.

WILLIAM H. DOYLE.